P. C. HARD.

Bed-Bottom.

No. 6,436. Reissued May 18, 1875.

Witnesses;

Jas. T. Duhamel.

Thomas Byrne

Inventor;

Pulaski C. Hard.

Per H. S. Abbot.

Attorney.

THE GRAPHIC CO. PHOTO-LITH. 39 & 41 PARK PLACE, N.Y.

UNITED STATES PATENT OFFICE.

PULASKI C. HARD, OF WADSWORTH, OHIO.

IMPROVEMENT IN BED-BOTTOMS.

Specification forming part of Letters Patent No. 136,158, dated February 25, 1873; reissue No. 6,436, dated May 18, 1875; application filed December 31, 1874.

*To all whom it may concern:*

Be it known that I, PULASKI C. HARD, of Wadsworth, in the county of Medina and State of Ohio, have invented certain new and useful Improvements in Bed-Bottoms; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to the mode or manner of attaching single-cone coiled-wire springs to wooden slats or frame for a spring bed-bottom, the springs being connected together at their upper and larger ends with metallic links, the slats or frame to which the springs are attached at their lower and smaller ends resting upon the bed-slats; and especially does this invention relate to the formation and terminus of the lower end of the springs, the object being a soft yielding bed-bottom made of coiled springs attached to wooden slats in a novel, safe, and economical manner.

Figure 1:
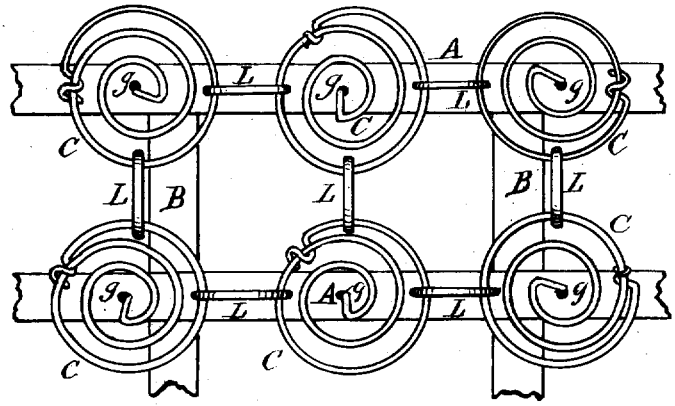
Figure 2:
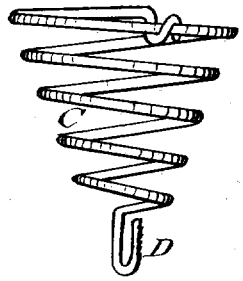

Figure 1 is a sectional view of a bed-bottom embodying my invention. Fig. 2 is a view of the spring, showing the formation and its terminus at the lower and smaller end.

A A are wooden slats braced by cross-slats B B, upon which the springs C are supported, and to which they are attached by means of the barbed loops or dowels D, inserted in the holes *g*. The spiral springs C, made from suitable wire, are provided with links L, connecting their upper ends and holding them in position, and terminating at their lower ends in a barbed loop or dowel, D, being a continuation of the lower coil. The loop or dowel D is formed by wire turned horizontally toward the center of the coil, then turned directly down, the end returning and resting under the arm of the loop or dowel, the outer sides of the dowel being barbed, the barbs extending upward. The springs C are attached to slats A by forcing the loop or dowel D into the hole *g*, which is somewhat smaller in diameter than the loop D.

Having thus described my invention, what I claim as new, and desire to secure by Letters Patent, is—

1. A loop or dowel formed on the lower end of a bed-spring, substantially as shown and described.

2. The combination of the spring C, having a loop or dowel, D, formed upon the lower end thereof, with the link L and slats A and B, substantially as shown and described.

In testimony that I claim the foregoing, I have hereunto set my hand this 21st day of December, 1874.

PULASKI C. HARD.

Witnesses:
GEO. K. PARDEE,
FRANK PHELPS.